Feb. 24, 1931.   J. R. HITE   1,793,932
CABLE CLAMP
Filed May 1, 1930   2 Sheets-Sheet 1
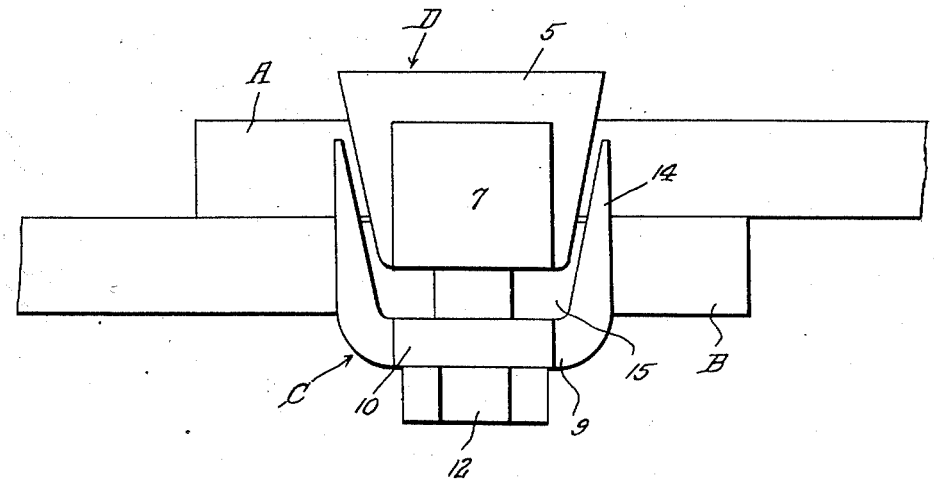
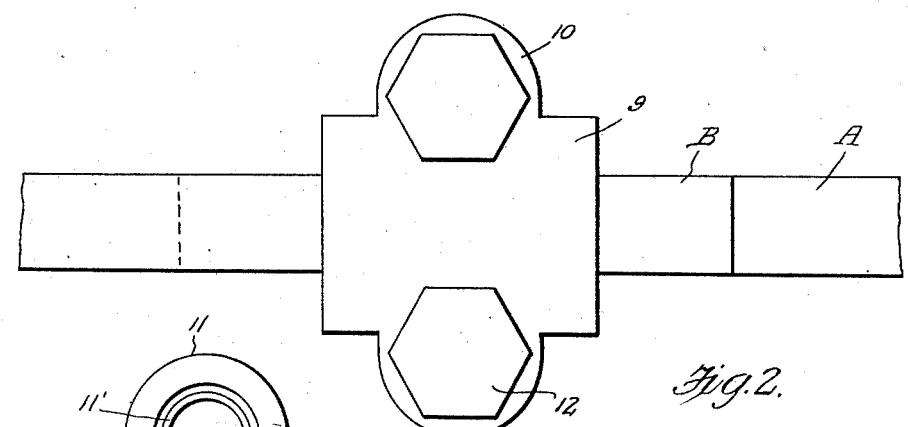
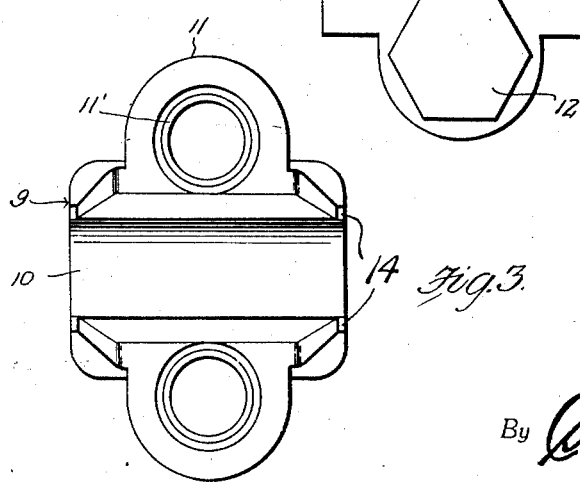
Inventor
J. R. Hite,
By Clarence A. O'Brien
Attorney Feb. 24, 1931. J. R. HITE 1,793,932
CABLE CLAMP
Filed May 1, 1930 2 Sheets-Sheet 2

Inventor
J. R. Hite,
By Clarence A. O'Brien
Attorney

Patented Feb. 24, 1931

1,793,932

UNITED STATES PATENT OFFICE

JOHN R. HITE, OF PHILADELPHIA, PENNSYLVANIA

CABLE CLAMP

Application filed May 1, 1930. Serial No. 449,064.

This invention relates broadly to clamps, and has more particular reference to a clamp especially adapted for securing and splicing the ends of cables together.

A primary object of this invention is to provide a cable clamp including a pair of co-operating members each of which is provided with a recess for accommodating the end of one of the cables to be clamped together, each of the members being further provided with cooperating means to facilitate the clamping together of the members for securely retaining the ends of the cables in clamped relation.

A still further object of the invention is to provide a clamp of the character above mentioned, which consists of comparatively few parts, is inexpensive to manufacture, and which will not require a great deal of skill when using the same for the purpose intended.

Other objects and advantages of the invention will become apparent during a study of the following description taken in connection with the accompanying drawings, wherein:—

Figure 1 is a top plan view of my improved clamp.

Fig. 2 is an elevational view looking at one side of the clamp.

Fig. 3 is a front elevational view of one of the clamping members.

Figure 4:
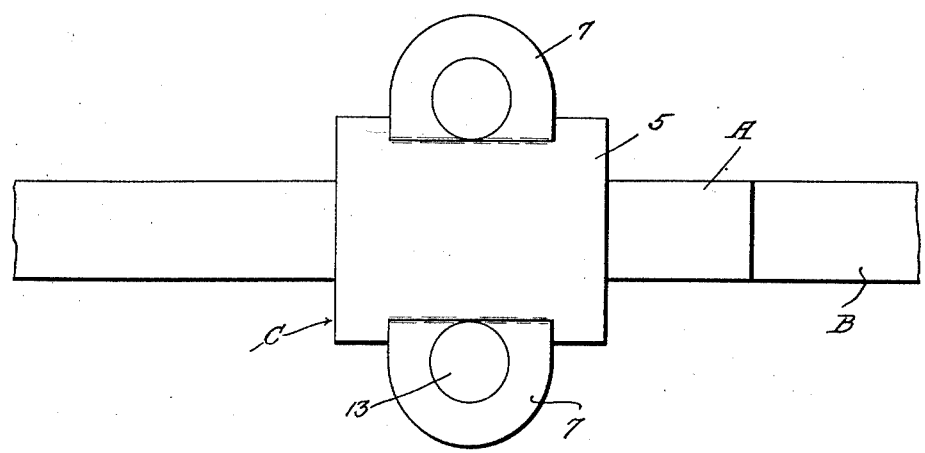
Fig. 4 is an elevational view looking at the opposite side of the clamp.
Figures 5, 6:
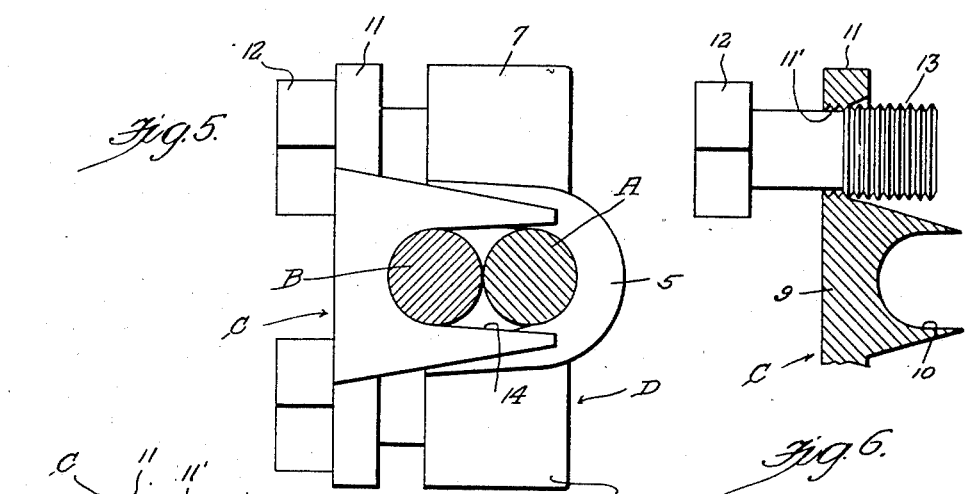
Fig. 5 is an end elevational view of my improved clamp.
Fig. 6 is a fragmentary detail view partly in section and partly in elevation of the other of the members of the clamp.

Thus, it will be seen that my clamp comprises two cooperating members C and D respectively.

The member D comprises a body portion 5 having a recess 5' extending longitudinally therethru and opening along one side and the opposite ends of the body 5. Said member is also provided with lugs 7 formed integral therewith at opposite sides thereof, for which for the sake of convenience may be termed at the top and bottom thereof.

The lugs 7 are provided with threads 8. The other of said members C also includes a body portion 9 having a recess 10 extending through the same and opening along one side and at opposite ends thereof. Apertured ears 11 are formed at opposite sides 4, more specifically at the top and bottom thereof for registry with the lugs 7.

The ears 11 are provided with countersunk apertures and at the small ends of the apertures are provided with screw threads 11'.

Figure 7:
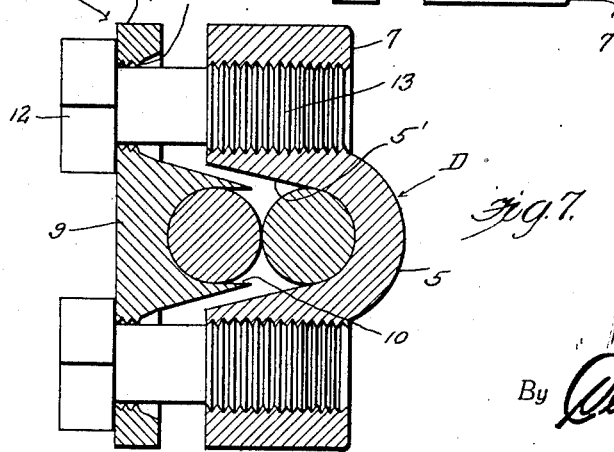
Fig. 7 is a vertical transverse sectional view taken through the clamp.

Bolts 12 are passed through the apertured ears 11 and at their free ends are provided with screw threads 13 cooperating with the threads 8 of the lugs 7. Adjacent their headed ends, the shanks of the bolts are smooth, as suggested in Fig. 7. In this connection, it will be noted that the bolts are first threaded through the ears 11, the threaded portions of the bolts engaging the threads 11' of said ears, prior to the threaded portions of the bolts, engaging the threaded lugs 7. Thus the threads 11' cooperate with the threads of the bolts for retaining the bolts within the bore of the ears when the parts are disassembled, thus liability of the bolts becoming lost when the parts are so disassembled is reduced to a minimum.

It is to be noted, that the top and bottom walls of the recess 5' converge inwardly towards the inner opposite end of the recess. Furthermore, the body portion 9 of the member C tapers transversely toward its open side, so that, the smaller open side of the body 9 may be at least partially received in the recess 5', the purpose of which will be hereinafter made manifest.

The member C at the opposite ends of the body 9 thereof, is provided with upper and lower extensions 14 at opposite ends thereof. The extensions 14 project laterally beyond the open side of the body 9. Between the extensions 14 and the top and bottom thereof, the member 9 is suitably recessed to provide pockets 15 for accommodating the top and bottom portions of the body 5 of the member D when the open side of the body 9 is received in the recess 5', as suggested in Fig. 1.

The extensions 14 straddle the table arranged in the recess of the member 5, and also extend on opposite sides of the body of the member 5 to act in the nature of a guide both for the cable, and for the member D when C and D are moved inwardly toward one another, so that the upper and lower portions of the body 5 will be guided into the pockets 15 provided therefor at the top and bottom of the body 9 of the member C.

Thus it may be also well to mention, that the body 5 tapers somewhat towards the open side thereof, so as to assure suitable space between the extensions 14 and the end edges of the body 5, to facilitate assembly and disassembly of the parts of the clamp.

The use of my device may be best set forth as follows:—A designates one end of one cable and reference character B designates an adjacent end of a second cable, the ends A and B designating the ends of the cables to be clamped together. The end A may be received in the recess 5′ and the ends B in the recess 10.

The ends A and B of the cables are then brought into overlapping engagement, the open side of the body 9 being received within the recess 5′, so that the overlapping ends A and B may be pressed one against the other.

Obviously, by tightening the bolts 12 the members B and C will be drawn inwardly toward one another, so that the ends A and B are securely gripped between the members within the recesses 5′ and 10′ respectively for securing the ends of the cables together.

It will be also noted that the end extensions 14 at the opposite ends of the body 9 are disposed in parallel relation with the adjacent ends of the body 5 and straddle the end A at each end of the member B.

From the foregoing, taken in connection with the accompanying drawings, it is thought that a clear understanding of the use, manner of operation, and certain details of construction will be clear to those skilled in the art, without a more detailed description.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:—

1. In a clamp of the class described a pair of cooperating members, each of which includes a body portion having a longitudinal recess extending through the same and opening inwardly from one longitudinal side thereof, one of said members having threaded lugs in the top and bottom thereof, the other of said members having apertured ears at the top and bottom thereof to aline with said lugs, said ears being provided with internal screw threads, and headed bolts including shanks having smooth portions to be received in the apertures of the ears, and threaded terminals threaded within said lugs.

2. In a clamp of the class described a pair of cooperating members, each of which includes a body portion having a longitudinal recess extending through the same opening inwardly from one longitudinal side thereof, one of said members having threaded lugs at the top and bottom thereof, the other of said members having apertured ears at the top and bottom thereof to aline with said lugs, said ears being provided with internal screw threads, headed bolts including shanks having smooth portions received in the apertures of the ears, and threaded terminals threaded within said lugs, said one member having the walls of its recess converging inwardly to receive therebetween the open side of the other of said members, said other of said members tapering transversely toward its open side.

3. In a clamp of the class described, a pair of cooperating members, each of which includes a body portion having a longitudinal recess extending through the said opening inwardly from one longitudinal side thereof, one of said members having threaded lugs at the top and bottom thereof, the other of said members having apertured ears at the top and bottom thereof to aline with said lugs, said ears being provided with internal screw threads, headed bolts including shanks having smooth portions received in the apertures of the ears, and threaded terminals threaded within said lugs, said one member having the walls of its recess converging inwardly to receive therebetween the open side of the other of said members, said other of said members tapering transversely toward its open side, said other member at each end thereof, provided with upper and lower extensions, terminating laterally of said other member at the open side thereof for disposition at opposite ends of the first-referred to member.

In testimony whereof I affix my signature.

JOHN R. HITE.